(No Model.) 2 Sheets—Sheet 1.
H. E. SMITH.
REVERSING BELT GEAR.
No. 355,569. Patented Jan. 4, 1887.
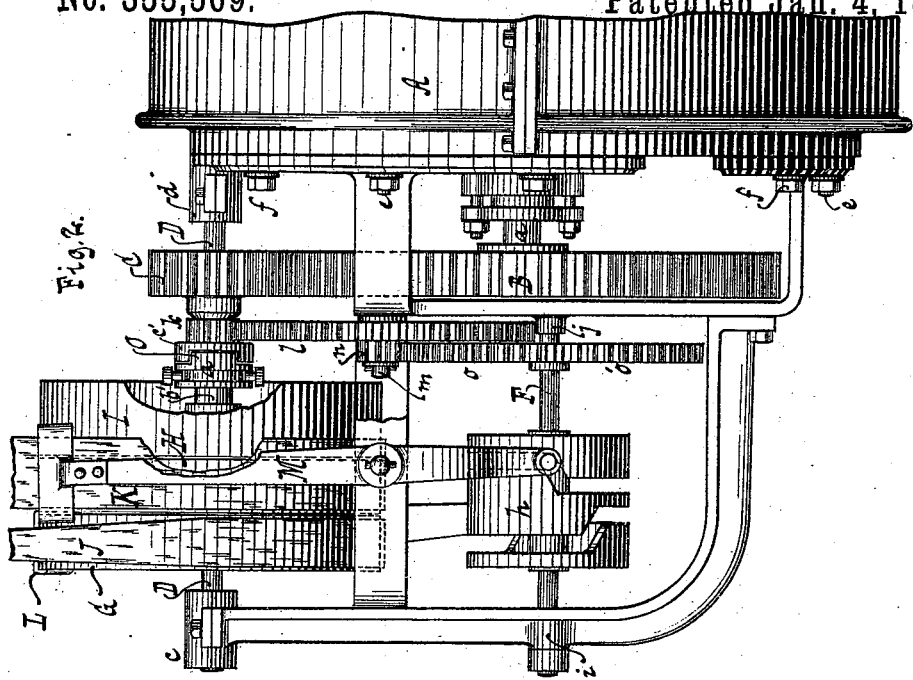
Witnesses
Otto Huffland
William Miller
Inventor
Hamilton E. Smith
by Van Santvoord & Hauff
his att'ys.

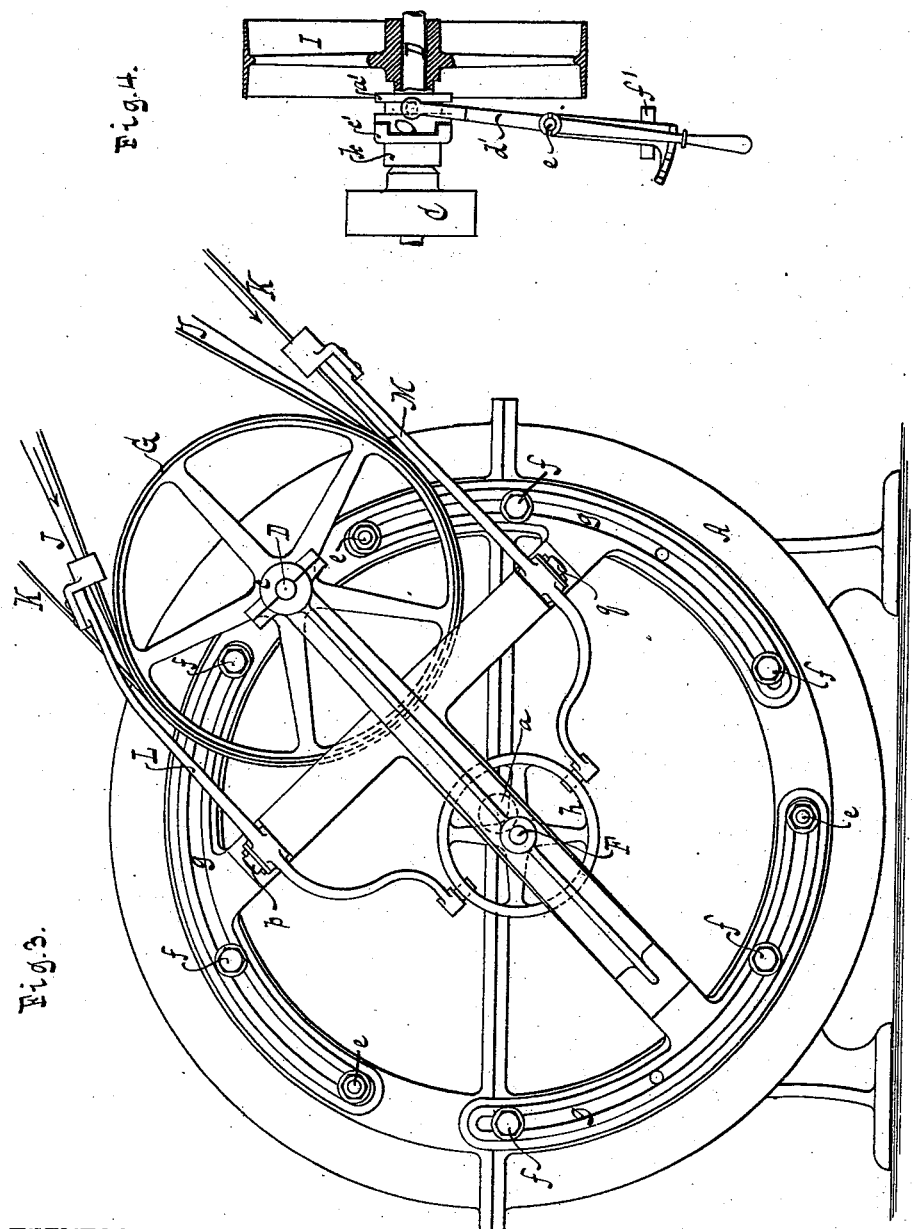

UNITED STATES PATENT OFFICE.

HAMILTON E. SMITH, OF NEW YORK, N. Y.

REVERSING BELT-GEAR.

SPECIFICATION forming part of Letters Patent No. 355,569, dated January 4, 1887.

Application filed April 29, 1886. Serial No. 200,551. (No model.)

*To all whom it may concern:*

Be it known that I, HAMILTON E. SMITH, a citizen of the United States, residing at New York, in the county and State of New York, have invented new and useful Improvements in Reversing Belt-Gear, of which the following is a specification.

This invention relates to devices for imparting reverse motions to a shaft by means of belts; and it consists in certain novel features of construction, which are fully pointed out in the following specification and claims, and illustrated in the accompanying drawings, in which—

Figure 1 represents an end view of my device. Fig. 2 is a side view. Fig. 3 is a diagram showing my device in a position different from Fig. 1. Fig. 4 is a detailed view of a clutch, which will be further described as the specification progresses.

Similar letters indicate corresponding parts.

In the example illustrated in the drawings I have shown my device attached to a cylindrical washing-machine such as described in United States Patent No. 195,176; but it is obvious that it may be applied to any machine where such a mechanism is required.

In the drawings, the letter A designates the casing of a washing-machine, in which is journaled the shaft $a$, which carries the cylinder of the machine, which rotates in the shell A first in one and then in the other direction. A large gear-wheel, B, is mounted on the shaft $a$ and engages a smaller gear-wheel, C, on the driving-shaft D. This shaft is journaled at $c$ and $d$ in a frame, E, which rotates around the axis of the shaft $a$, and can be adjusted in any position by means of stud-bolts $e$, which project from the casing A, and by screw-bolts $f$, tapped into said casing, both said stud and screw bolts passing through the circular slot $g$ in said frame, in which the shaft F, carrying the cam $h$, is journaled at $i$ and $j$.

On the shaft D, which is the driving-shaft, are mounted three pulleys, G H I, two of which, G and I, are loose, while the third, H, is fast thereon. The pulleys G and H are of equal width of face—say two and one-half inches—while the pulley I is somewhat wider—say three and one-half inches—"face." Two belts, J and K—the former, say two and one-half inches wide, the latter three and one-half inches wide—connect these pulleys with the line-shaft, the belt J being twisted, while the belt K is straight, so that when the former is on the fast pulley H the latter will be on the loose pulley I, and the shaft D will be revolved in one direction, while when the belt K is on the fast pulley the shaft will be revolved in the other direction. In the drawings, Fig. 2, the last-described position of the belts is shown, and from this figure it will be observed that the belt K is of such width that even when completely covering the pulley H it will extend beyond said pulley and still act on the loose pulley I.

From this description and the drawings it will be understood that the loose pulley I is continuously revolved by the belt K, even when the latter is on the fast pulley H.

On the shaft D is also loosely mounted a pinion, $k$, which may be connected to the hub of the pulley I by a clutch, O, Figs. 2 and 4; or it may be permanently fastened to said pulley. This pinion engages a gear-wheel, $l$, mounted loosely on a stud, $m$, projecting from the frame E. To this gear-wheel is attached a pinion, $n$, which engages a gear-wheel, $o'$, mounted on the shaft F, which carries the cam $h$, acting on the free ends of two belt-shifters, L M, pivoted to the frame E at $p$ and $q$, one of which acts on the belt J while the other acts on the belt K, so that when the cam is revolved, as above described, it will cause the belts to be alternately carried onto the fast pulley H on the shaft D and cause the latter to be rotated alternately first in one direction and then in the other. When the line-shaft is directly over the pulleys G H I, the position of the frame E, which, as above described, carries the whole of my reversing-gear, is as shown in Fig. 1; but when it is necessary to place the machine carrying my device either to one side or to the other of said shaft I find it becomes necessary to turn the reversing-gear to the required angle, and for this purpose I have mounted the whole device in the frame E and made the latter adjustable in any position, as described above.

When it is desired to run the driving-shaft continuously in one direction, the movable head $a'$ of the clutch which slides loosely on the hub of the loose pulley I, but is compelled to turn with it by the feather-key $b'$ on said hub, is disengaged from the head $c'$ of the clutch, which is carried by the pinion $k$ by means of the handle $d'$, pivoted at $e'$ to a bracket, $f'$, secured to the frame E. This operation will disengage the reversing mechanism and the same will remain at rest, while the driving-shaft D will be free to revolve in the direction imparted to it by the belt then on the fast pulley H.

By reference to the drawings, Fig. 2, it will be seen that the cam $h$ is of such a shape that it will move first one belt-shifter, then the other, or, in other words, that it will not move both belt-shifters simultaneously. This has two advantages: First, it will permit the main shaft to recover from any momentum caused by the motion of the same in the one direction before it is subjected to the action of the belt which is to turn it in the other direction, as the belts will be both on the loose pulleys during the time intervening between the motion of the two belt-shifters. The other advantage is that during this time when both belts are on the loose pulleys the clutch O may be disengaged, thereby disengaging the reversing mechanism, causing the belt-shifters to remain at rest, and permitting the belts to remain on the loose pulleys, which, obviously, will cause the machine to which my device is attached to stop.

What I claim as new, and desire to secure by Letters Patent, is—

1. The combination, with the driving-shaft, the pulleys G H I, mounted thereon, the belt-shifters L M, and the reversing mechanism actuating said belt-shifters, of the adjustable rotating frame E, carrying said driving-shaft, belt-shifters, and reversing mechanism, substantially as described.

2. The combination of the driving-shaft D, the pulleys G H I, mounted thereon, the belt-shifters L M, the shaft F, the cam $h$, mounted on said shaft, connections between said shaft and the driving-shaft D, and the clutch O, substantially as and for the purpose described.

3. The combination of the driving-shaft D, having the pinion $k$, the pulleys G, H, and I on the shaft, the stud $m$, the gear-wheel $l$, mounted on the stud and having the attached pinion $n$, the shaft F, having the gear-wheel $o'$, the cam $h$ on said latter shaft, and the belt-shifters L and M engaging the cam, substantially as described.

In testimony whereof I have hereunto set my hand and seal in the presence of two subscribing witnesses.

HAMILTON E. SMITH. [L. S.]

Witnesses:
W. HAUFF,
OTTO HUFELAND.